(12) United States Patent
Ookawa et al.

(10) Patent No.: US 6,585,166 B1
(45) Date of Patent: Jul. 1, 2003

(54) COMPOSITE IC CARD

(75) Inventors: Takehiro Ookawa, Tachikawa (JP); Hiroshi Yoshigi, Hinode (JP); Tadashi Oonishi, Musashimurayama (JP); Kazuki Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/018,803

(22) PCT Filed: Jun. 29, 1999

(86) PCT No.: PCT/JP99/03475
§ 371 (c)(1),
(2), (4) Date: Dec. 21, 2001

(87) PCT Pub. No.: WO01/01340
PCT Pub. Date: Jan. 4, 2001

(51) Int. Cl.[7] ............................................... G06K 19/06
(52) U.S. Cl. ....................................... 235/492; 235/441
(58) Field of Search ................................ 235/441, 380, 235/382, 375, 487, 492; 340/825; 375/326

(56) References Cited

U.S. PATENT DOCUMENTS

| | | | | |
|---|---|---|---|---|
| 5,113,184 A | * | 5/1992 | Katayama | 713/400 |
| 5,353,434 A | * | 10/1994 | Katayama | 235/441 |
| 5,418,353 A | * | 5/1995 | Katayama et al. | 257/679 |
| 5,898,738 A | * | 4/1999 | Nagata et al. | 375/326 |
| 5,929,414 A | * | 7/1999 | Saitoh | 235/380 |
| 6,045,043 A | * | 4/2000 | Bashan et al. | 235/441 |
| 6,161,762 A | * | 12/2000 | Bashan et al. | 235/492 |
| 6,427,065 B1 | * | 7/2002 | Suga et al. | 455/41 |
| 6,465,880 B1 | * | 10/2002 | Dobashi et al. | 257/679 |

FOREIGN PATENT DOCUMENTS

| | | |
|---|---|---|
| JP | 04-023092 | 1/1992 |
| JP | 05-233889 | 9/1993 |
| JP | 10-124626 | 5/1998 |
| JP | 10-505932 | 6/1998 |
| JP | 10-320510 | 12/1998 |

* cited by examiner

Primary Examiner—Thien M. Le
Assistant Examiner—Edwyn Labaze
(74) Attorney, Agent, or Firm—Mattingly, Stanger & Malur, P.C.

(57) ABSTRACT

An IC card capable of preventing the occurrence of an abnormal state of coupling and thereby preventing malfunction of IC is provided. The IC card is provided with a coupling detecting means for detecting a contact coupling and a non-contact coupling and is also provided with a communication cut-off means which, when there are supplied electric power and a signal for inducing the other coupling during communication by one coupling, cuts off communication so that communication is performed by neither of the couplings.

14 Claims, 9 Drawing Sheets

COMPOSITE IC CARD

TECHNICAL FIELD

The present invention relates to a card which incorporates a semiconductor integrated circuit (hereinafter referred to as "IC" card) and more particularly to an IC card wherein an information processor mounted on an IC is used in common for both communication by a contact coupling with an external device through a connector and communication by a non-contact coupling through an antenna.

BACKGROUND ART

As known well, a contact type IC (Integrated Circuit) card is coupled through a connector to an external device, e.g., a data reader/writer (simply "reader/writer" hereinafter) and performs transmission and reception of signals between it and the reader/writer while being supplied with electric power through the connector. On the other hand, a non-contact IC card couples to the reader/writer in a non-contact state through an antenna and performs transmission and reception of signals between it and the reader/writer while being supplied with electric power through the antenna.

Recently, a single card which permits either the above contact or non-contact type communications has been devised or being developed as a dual interface IC card (see, for example, Published Japanese Translations of PCT International Publication for Patent Applications No. Hei 10-505932). The dual interface IC card is convenient for users and therefore its application range is being widened.

FIG. 8 shows an internal circuit configuration of a conventional dual interface IC card. An internal circuit 2 is integrated into an IC chip. Electric power from a power supply and signals are supplied through a coiled antenna 1 in case of a non-contact type operation or through a connector 10 in case of a contact type operation. As bidirectional signals to and from an information processor 8, signals having gone through either the antenna 1 or the connector 10 are selected by a selector 22. For example, in the prior art being considered, the selection is made by a voltage detector 21 detecting that electric power has been fed to a terminal Vdd of the connector 10 and, as a result of the detection, the signals having gone through the connector 10 are selected.

In this way the information processor 8 is used in common by both contact and non-contact type communications. In the above conventional example, priority is given to the communication through the connector 10, namely, to a contact coupling to avoid simultaneous contact and non-contact operations.

Usually, the information processor 8 has a processing unit and a memory and reads the contents of the memory in accordance with directions given by a reader/writer and provides a transmission signal or rewrites the memory contents by use of a reception signal provided from the reader/writer.

As electric power in non-contact operation, a high frequency signal received by the antenna 1 is rectified and smoothed by a rectifier and smoothing circuit 3 and a DC output voltage is obtained as the electric power. On the other hand, electric power from the connector 10 is obtained through a terminal thereof directly from the reader/writer.

FIG. 9 shows a conventional example in which priority is given to a non-contact coupling side. In this example, a high frequency detector 23 for detecting a high frequency signal from the antenna 1 is used instead of the voltage detector 21 and the selecting operation of the selector 22 is controlled in accordance with whether a high frequency signal is present or not.

DISCLOSURE OF THE INVENTION

In the above-mentioned dual interface IC card, the IC can be caused to malfunction, for example, by intermitting the priority-side coupling while communication is made through a coupling on the non-priority side. It is possible that such a malfunction is caused to occur intentionally to conduct tampering (opening or altering the contents of IC without permission). It is the present situation that such an inconvenience cannot be avoided.

It is an object of the present invention to provide an IC card capable of preventing the occurrence of an abnormal state of coupling and thereby preventing an abnormal operation of IC.

For achieving the above-mentioned object, the IC card of the present invention is characterized by including a coupling detecting means for detecting a contact coupling and a non-contact coupling and a communication cut-off means which, when there are supplied electric power and a signal for inducing the other coupling during communication by one coupling, cuts off the communication so that the communication is performed by neither of the couplings. Thus, since all of communicating functions are cut off upon supply of electric power and a signal for inducing the other coupling, malfunction of IC is prevented.

BEST MODE FOR CARRYING OUT THE INVENTION

Figure 1:
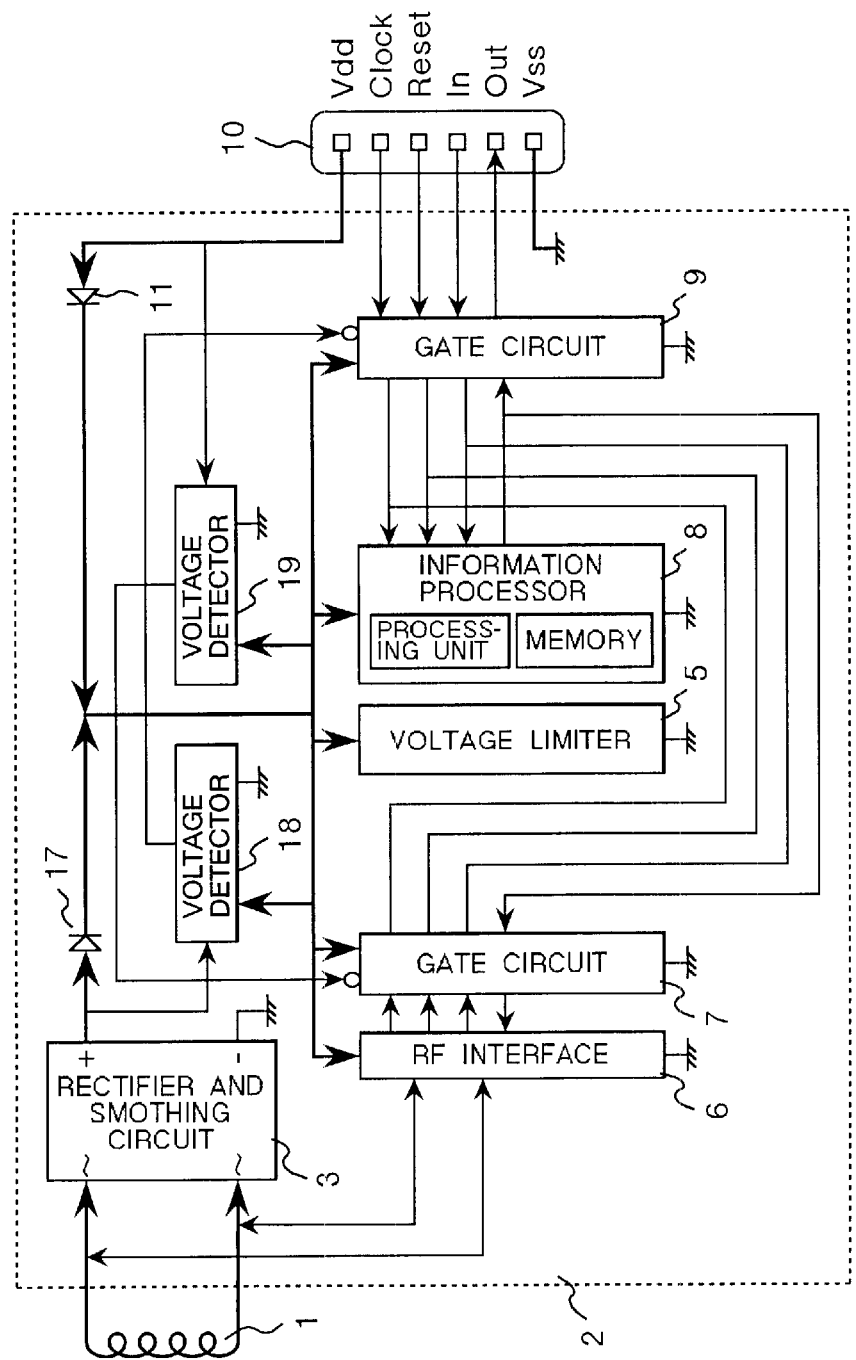
FIG. 1 is a circuit diagram for explaining an IC card according to a first embodiment of the present invention.

The IC card of the present invention will be described below in more detail by way of embodiments thereof with reference to the drawings. In FIGS. 1 to 9, the same reference numerals represent the same or similar portions.
(First Embodiment)

In FIG. 1, the numeral 18 denotes a voltage detector which detects that a DC voltage has been outputted from the rectifier and smoothing circuit 3 in case of making communication by a non-contact coupling. Numeral 19 denotes a voltage detector which detects that electric power Vdd has been supplied from the connector 10 in case of making communication by a contact coupling. Numerals 7 and 9 denote respectively a gate circuit which performs connection and disconnection between the information processor 8 and an RF interface 6 and a gate circuit which performs connection and disconnection between the information processor 8 and the connector 10, with respect to a clock signal, a reset signal and a data reception signal provided to the information processor 8 and a data transmission signal provided from the information processor.

The voltage detectors 18 and 19 each comprise a comparator which detects whether a voltage is present or not. Gate circuits 7 and 9 are general gate circuits which cease to conduct and cut off connection upon arrival of signals on negative inputs indicated by small circles on the respective block lines in FIG. 1. Output terminals of the voltage detectors 18 and 19 are connected to the negative inputs of the gate circuits 9 and 7, respectively.

Further, the RF interface 6 demodulates the high frequency signal provided from the antenna 1, produces a clock signal, a reset signal and a data reception signal, and modulates a data transmission signal provided from the information processor 8 into the high frequency signal provided from the antenna 1. The connector 10 has terminals Clock, Reset, In, and Out for a clock signal, a reset signal, a data reception signal, and a data transmission signal, respectively. A terminal Vss is connected to ground. A diode 11 is for preventing a reverse flow of supply current. A voltage limiter 5 is for preventing supply voltage from rising beyond a limit in non-contact operation.

The internal circuit 2 constructed as above is integrated into a single IC chip. This IC chip and the antenna 1, which is coil-like, are embedded in a basis material of card and the connector 10 is mounted on the back side of the card basis material to constitute an IC card. In this embodiment the IC card is fabricated as a dual interface IC card.

Figure 2:
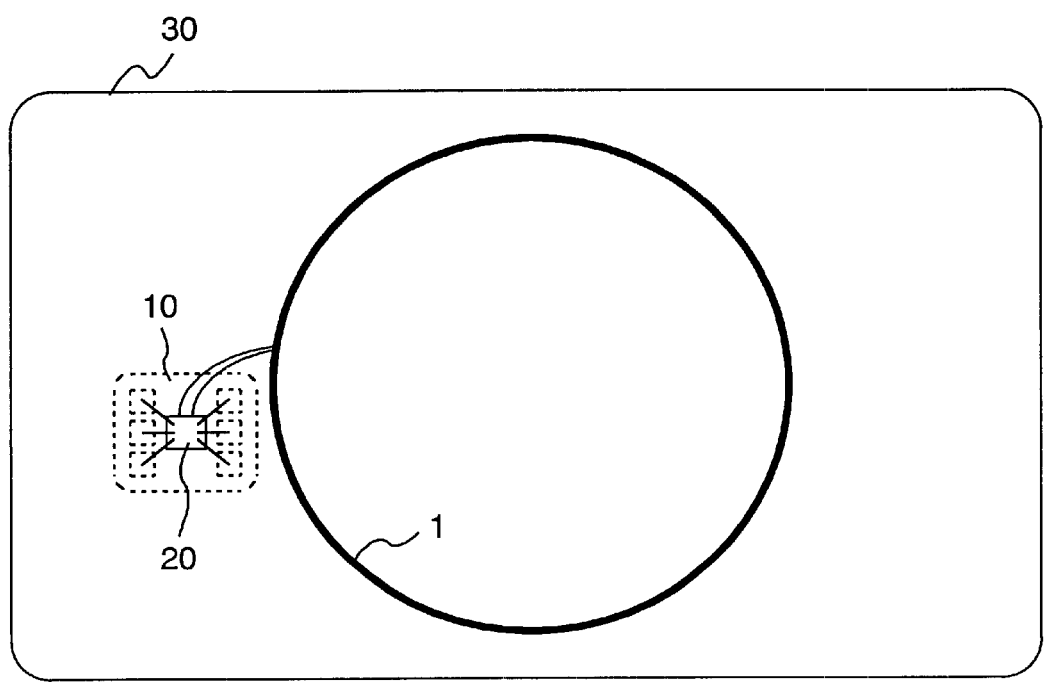
FIG. 2 is a plan view of a dual interface IC card for explaining the first embodiment.

FIG. 2 is a plan view of the dual interface IC card with a surface layer of the basis material removed. In the same figure, the numeral 20 denotes an IC chip and numeral 30 denotes the IC card with the surface layer removed. The IC chip 20 is connected to the terminals of the connector 10 by wire bonding.

Next, the following description is provided about the operation of the internal circuit 2 in the IC card 30 of this embodiment. Description will first be directed to the operation in a non-contact coupling in which transmission and reception of electric power, clock signal, reset signal and data signals are performed through the antenna 1. A high frequency electric power received by the antenna 1 is converted to a DC voltage by the rectifier and smoothing circuit 3, then the DC voltage passes through a reverse current preventing circuit 17 and is thereafter limited by the voltage limiter 5. The voltage thus limited is fed to each circuit. Further, the DC output voltage from the rectifier and smoothing circuit 3 is inputted to the voltage detector 18. On the other hand, the clock signal, reset signal and data transmission/reception signals, which are transmitted and received through the antenna 1, are processed by the RF interface 6 and fed through the gate circuit 7 to the information processor 8 which includes memory.

Since the output terminal of the voltage detector 18 is connected to the gate circuit 9, the gate circuit 9 receives an output signal from the voltage detector 18 which signal is obtained as a result of voltage generation in the rectifier and smoothing circuit 3, and cuts off connection between the connector 10 and the information processor 8. Therefore, even if electric power and signals arrive at the connector 10, communication is not performed.

However, since the power supply Vdd is connected to the voltage detector 19, a signal indicating a detection result of the supply voltage Vdd is outputted and the gate circuit 7 also turns OFF. As a result, all the communication functions are cut off.

Next, a description will be given of the operation in a contact coupling in which electric power, clock signal, reset signal and data signals are transmitted and received through the connector 10. DC supply voltage Vdd from the connector 10 is fed to each circuit via the reverse current preventing diode 11. The supply voltage Vdd is further inputted to the voltage detector 19. The clock signal, reset signal and data transmission/reception signals provided from the connector 10 are fed to the information processor 8 via the gate circuit 9. Since the output terminal of the voltage detector 19 is connected to the gate circuit 7, the gate circuit 7 inputs an output signal from the voltage detector 19 which results from the supply of electric power from the connector 10, and breaks the connection between the RF interface 6 and the information processor 8.

However, the rectifier and smoothing circuit 3 is connected to the voltage detector 18, so when a high frequency signal arrives at the antenna 1 and a DC voltage is generated, a signal resulting from voltage detection is outputted and the gate circuit 9 turns OFF. As a result, all the communicating functions are cut off.

As described above, when a coupling is detected by the supply of electric power and when electric power is supplied for inducing the other coupling during communication by one coupling, it becomes possible to let operation take place for cutting off all the communicating functions. Thus, communication in an abnormal state of coupling can be made infeasible and it is possible to obtain a highly tamper-proof IC card.

(Second Embodiment)

Figure 3:
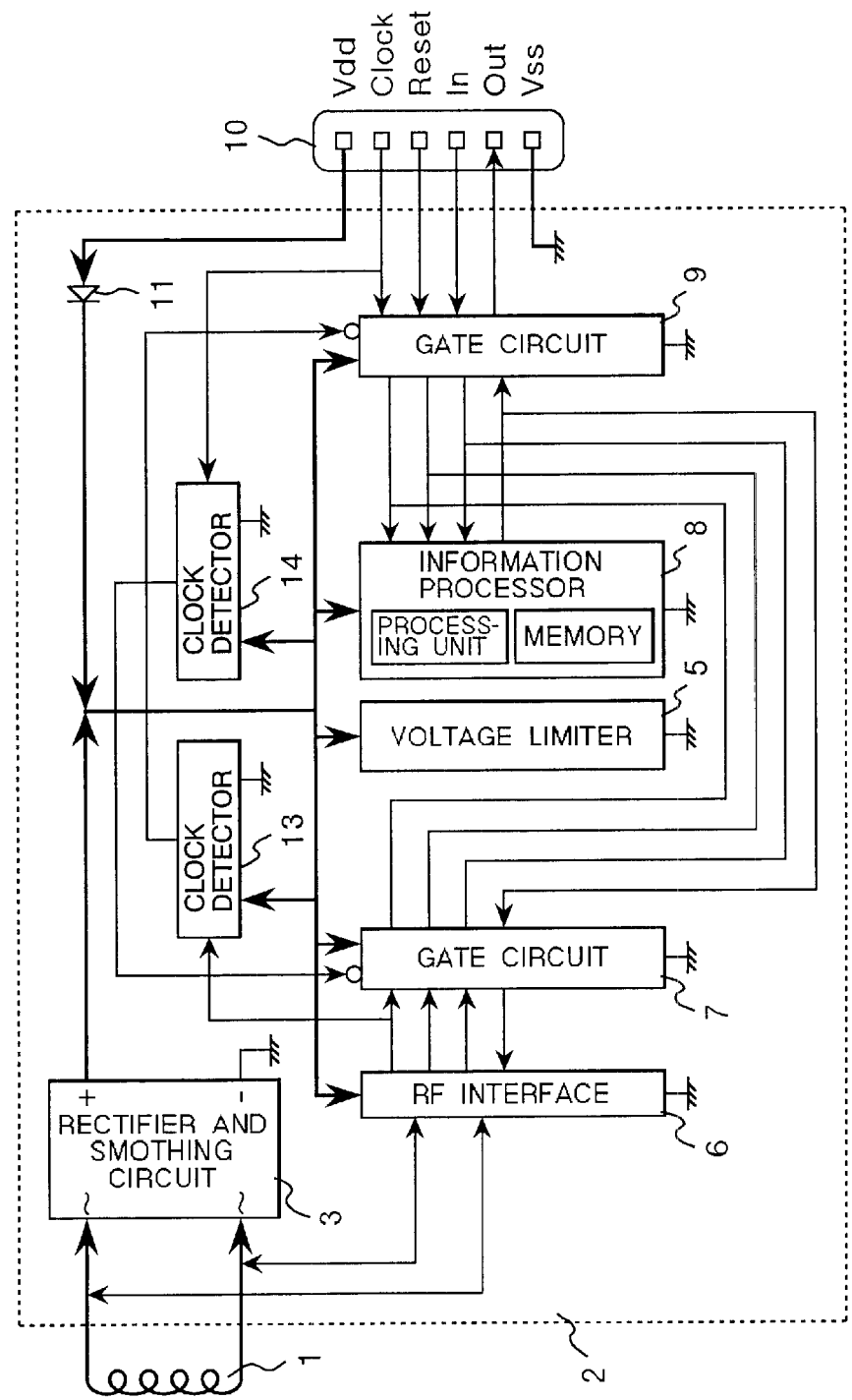
FIG. 3 is a circuit diagram for explaining a second embodiment of the present invention.

FIG. 3 shows an embodiment in which a coupling is detected on the basis of whether a clock signal is present or not instead of detecting a coupling by voltage detection which is adopted in the first embodiment. In FIG. 3, the numeral 13 denotes a clock detector for detecting a clock signal produced in the RF interface 6 and numeral 14 denotes a clock detector for detecting a clock signal provided from the connector 10. The clock detectors 13 and 14 are each constituted by a retriggerable monostable multivibrator. Each of the clock detectors, upon input of a clock signal, detects it and outputs the result of the detection. An output terminal of the clock detector 13 is connected to a negative input of the gate circuit 9 and an output terminal of the clock detector 14 is connected to a negative input of the gate circuit 7. Other constructional points are the same as in the first embodiment.

In case of operation by a non-contact coupling through the antenna 1, the gate circuit 9 inputs an output signal from the clock detector 13 which results from the generation of a clock signal in the RF interface 6, and breaks the connection between the connector 10 and the information processor 8. Therefore, communication is not performed even upon arrival of electric power and a signal at the connector 10.

However, since a clock signal arriving at the terminal Clock of the connector 10 is fed to the clock detector 14, a detection result signal indicating the presence of the clock signal is outputted to turn OFF the gate circuit 7. As a result, all of the communicating functions are cut off.

Next, in case of operation by a contact coupling through the connector 10, the gate circuit 7 inputs an output signal from the clock detector 14 which results from the supply of a clock signal from the connector 10, and breaks the connection between the RF interface 6 and the information processor 8.

However, the RF interface 6 is connected to the clock detector 13, so upon arrival of a high frequency signal at the antenna 1 and generation of a clock signal, a signal resulting from the clock detection is outputted and the gate circuit 9 turns off. As a result, all of the communicating functions are cut off.

As the clock detectors 13 and 14 there also may be used, for example, flip-flops. The flip-flops, upon input of a clock signal, maintains the state that the signal is present and outputs a clock detection signal.

Thus, a coupling is detected by the supply of a clock signal, and when there is fed a clock signal for inducing the other coupling during communication by one coupling, it is possible to let operation take place for cutting off all the communicating functions, whereby it is possible to make communication infeasible in an abnormal state of coupling. In this way there can be obtained a highly tamper-proof IC card. There is a case where during communication by a contact coupling, there still is a distance from a source of disturbance, the intensity of radio wave from the antenna side is weak and the detection of electric power supplied is unsatisfactory, but it is possible to detect a clock signal. In such a case, the clock detecting function of this embodiment permits an earlier detection of tamper.

(Third Embodiment)

Figure 4:
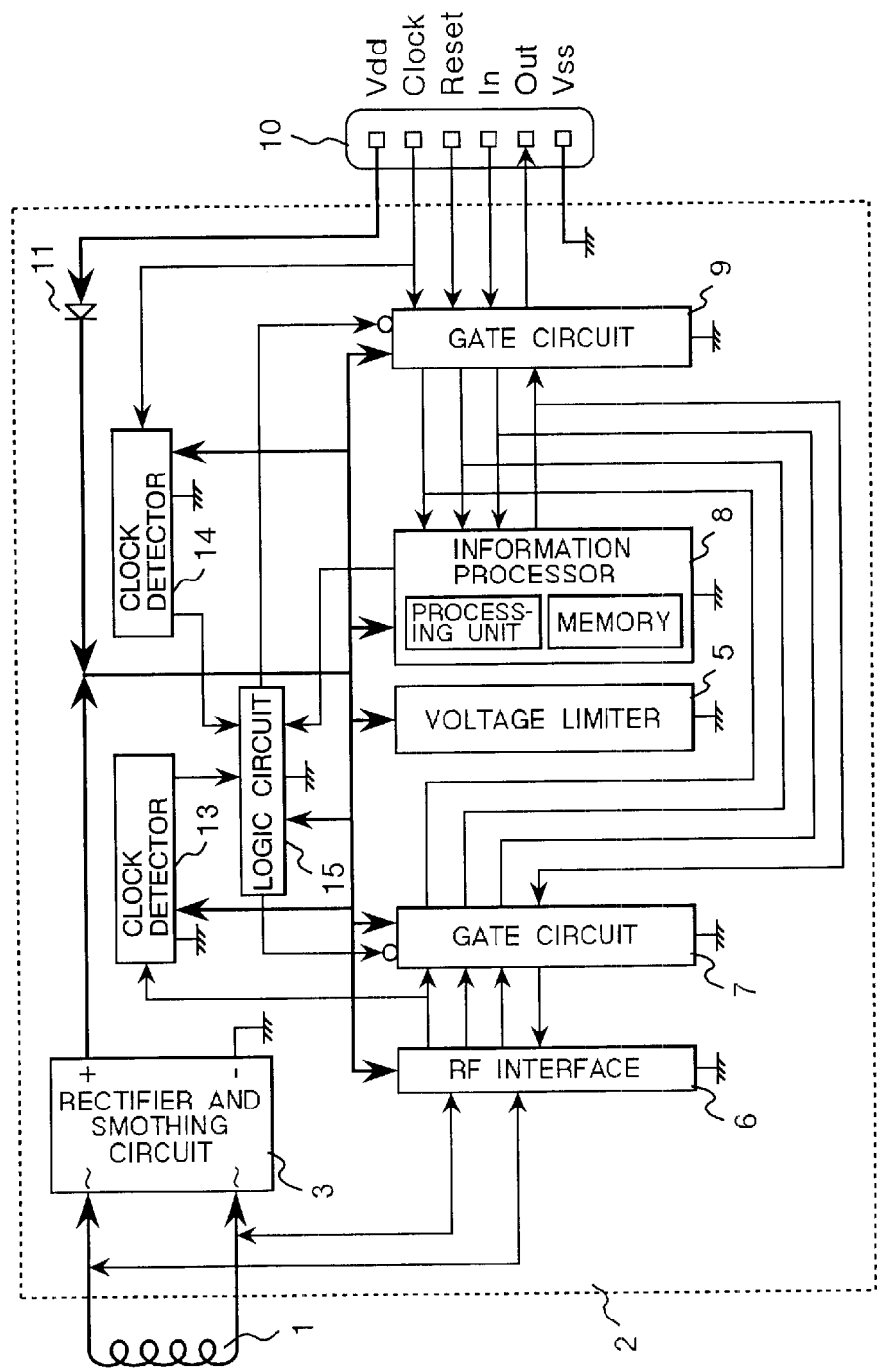
FIG. 4 is a circuit diagram for explaining a third embodiment of the present invention.

FIG. 4 illustrates an embodiment wherein, in the above second embodiment, the interruption of all the communicating functions is not performed until the end of memory writing operation of the information processor 8. In the same figure, the numeral 15 denotes a logic circuit which cuts off output signals from the clock detectors 13 and 14 during the memory writing operation. Other constructional points are the same as in the previous second embodiment.

Figure 5:
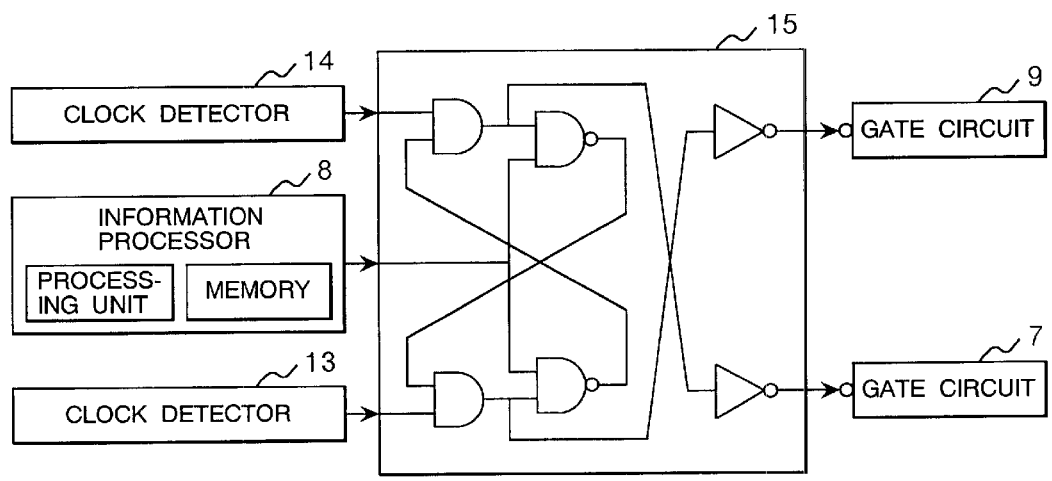
FIG. 5 is a circuit diagram for explaining a logic circuit used in the third embodiment.

The logic circuit 15 inputs output signals from the clock detectors 13 and 14 and also inputs a Memory Access Flag, then performs a logical operation. The configuration thereof is shown in FIG. 5. An output terminal of the logic circuit 15 is connected to the negative inputs of the gate circuits 9 and 10. In this embodiment, a rewritable nonvolatile semiconductor memory is used as the memory and a gate signal for working a voltage step-up circuit in the memory is used as the Memory Access Flag. As the memory there also may be used another type of a nonvolatile semiconductor memory.

According to the logical configuration shown in FIG. 5, in the case where the other clock detector has detected a clock signal after one clock detector detected a clock signal, and as long as the Memory Access Flag exists, the output of the other clock detector is blocked until the end of the memory writing operation. That is, the Memory Access Flag is used as a signal for determining whether the memory is being written or not, and the interruption of all the communicating functions is not performed until the end of the memory writing operation.

When the memory writing operation is over, an output signal from the other clock detector is provided from the logic circuit 15, whereby the operation of the third embodiment is performed and all the communicating functions are cut off.

Thus, in the case where a coupling is made by another method while the information processor 8 is performing the memory writing operation after a coupling has been established by one method, the communication by the later method remains cut off, while the prior coupling is not cut off until the end of the memory writing operation. In this way there is obtained a highly tamper-proof IC card which permits prevention of the memory contents from damage.

The detection of a coupling is not limited to the detection of a clock signal described in the above second embodiment. In this third embodiment there also may be adopted the detection of voltage described in the first embodiment, whereby there can be obtained the same effect.

(Fourth Embodiment)

Figure 6:
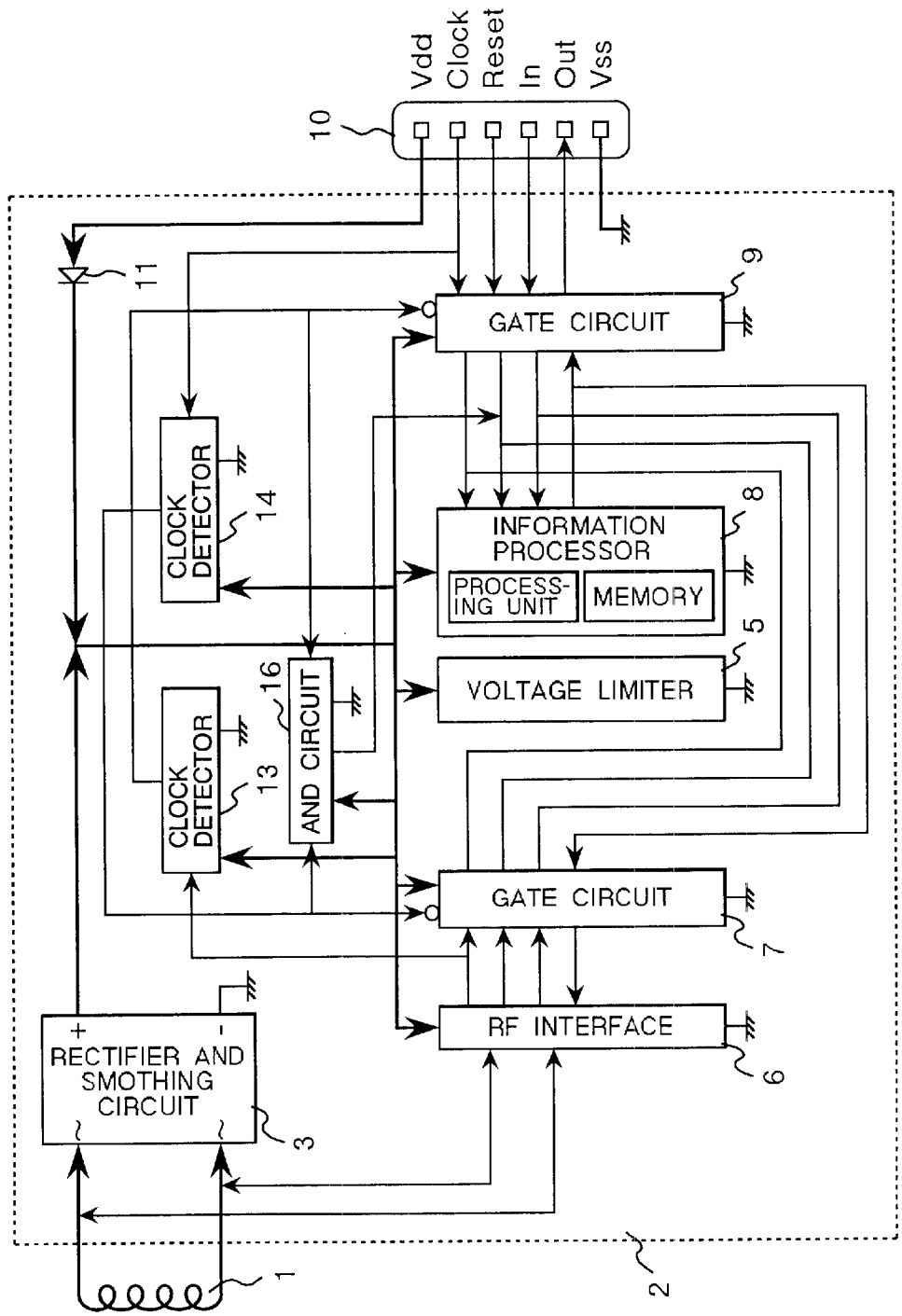
FIG. 6 is a circuit diagram for explaining a fourth embodiment of the present invention.

FIG. 6 illustrates an embodiment in which the information processor 8 is reset when all the communicating functions are cutoff in the second embodiment. In the same figure, the numeral 16 denotes an AND circuit which carries out AND operation to output signals from the clock detectors 13 and 14 and which outputs a reset signal when signals indicative of detection results are outputted simultaneously from both clock detectors. Other constructional points are the same in the second embodiment.

As to a processing unit in the information processor 8 there sometimes occurs a case where it is inevitably required to adopt a logical structure such that the processing unit does not perform a predetermined operation but causes runaway upon re-supply of a clock signal after suspension of the clock signal supply during a power ON condition.

This embodiment intends to avoid the occurrence of such an inconvenience. In this embodiment there is adopted the following way for attaining this object. In the case where, after detection of a clock signal by one clock detector through one coupling, the other coupling is added and the other clock detector has also detected a clock signal, a reset signal is provided from the AND circuit 16 to the information processor 8 to reset the information processor. Consequently, the operation described in the third embodiment is executed to cut off all the communicating functions and the runaway of the information processor 8 upon re-supply of a clock signal is prevented.

The detection of a coupling is not limited to the detection of a clock signal described in the above second embodiment. In this fourth embodiment there also may be adopted the detection of voltage described in the first embodiment, whereby there can be obtained the same effect.

(Fifth Embodiment)

Figure 7:
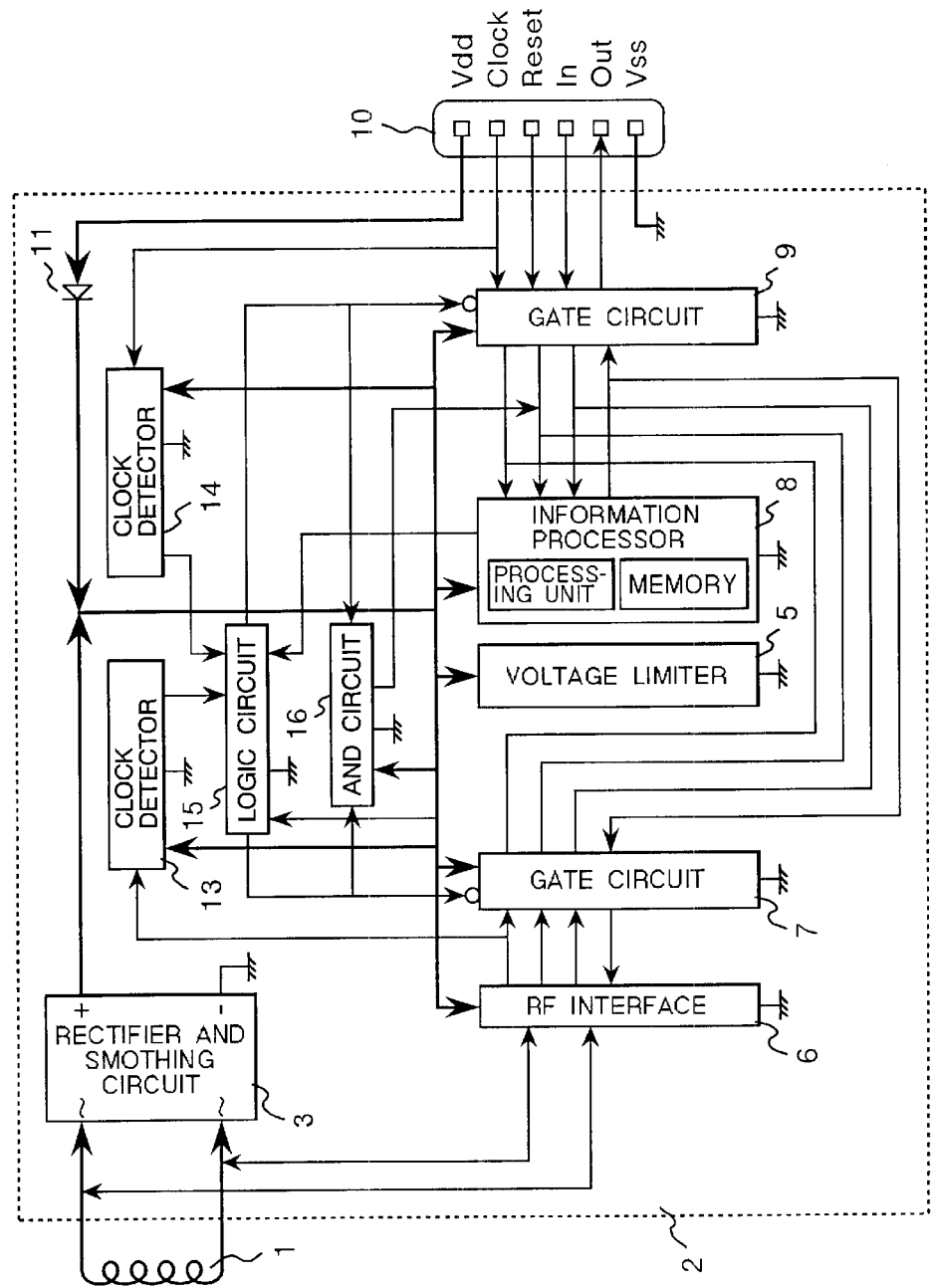
FIG. 7 is a circuit diagram for explaining a fifth embodiment of the present invention.
Figure 8:
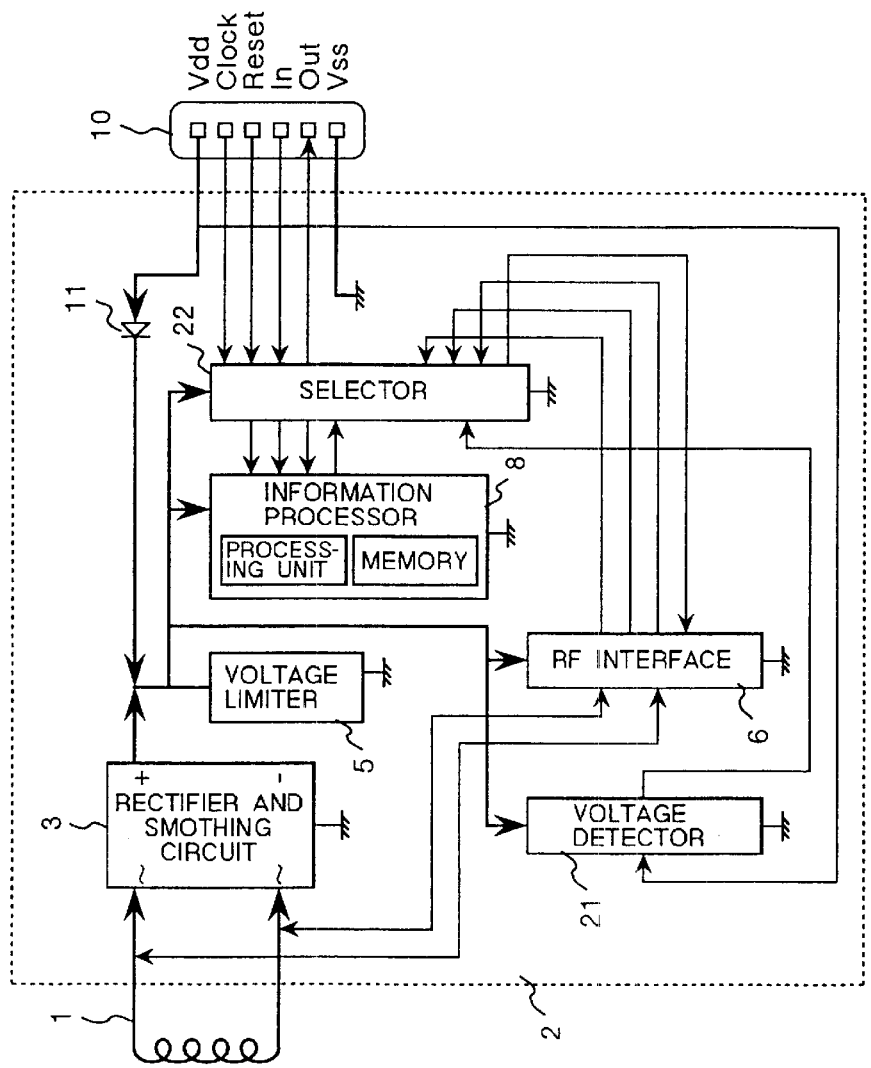
FIG. 8 is a circuit diagram for explaining an example of a conventional dual interface IC card.
Figure 9:
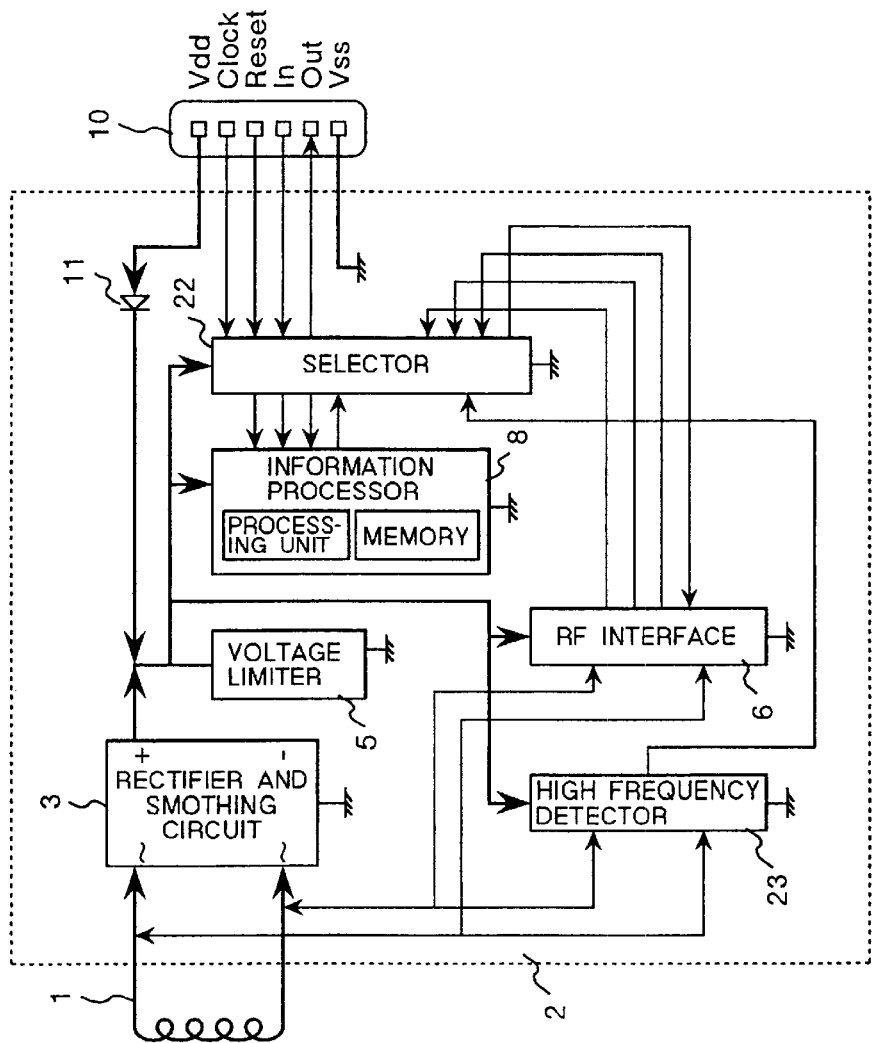
FIG. 9 is a circuit diagram for explaining another example of a conventional dual interface IC card.

FIG. 7 illustrates an embodiment wherein the reset of the information processor 8 described in the fourth embodiment is performed after the delay of output from the other clock detector described in the third embodiment. An AND circuit 16 is added to the third embodiment and an output signal from the logic circuit 15 is inputted to the AND circuit 16. Thus, AND circuit 16 outputs a reset signal to reset the information processor 8 after a lapse of a delay period until the end of memory writing operation.

In this way there can be obtained a highly reliable IC card which can prevent the memory contents from damage and which also can prevent runaway of the information processor 8.

The detection of a coupling is not limited to the detection of a clock signal described in tee second embodiment. In this embodiment there also may be adopted the detection of voltage described in the first embodiment, whereby there can be obtained the same effect.

According to the present invention, when there are supplied electric power and a signal for inducing the other coupling during communication by one coupling, the communication is cutoff against both couplings. Consequently, it becomes possible to prevent the contents of IC from being opened or altered without permission, that is, prevent tampering, and hence possible to provide a highly tamper-proof IC card.

INDUSTRIAL APPLICABILITY

The IC card according to the present invention can handle a wide range of information, including cash, address, private information and identification; besides, an abnormal operation is prevented as described earlier. Therefore, it is applicable to a wide variety of fields, including financial, distribution, traffic, and medical care insurance fields.

What is claimed is:

1. An IC (Integrated Circuit) card which has a semiconductor integrated circuit integrating an internal circuit for communication with an external device, an antenna and a connector, and is capable of supply of electric power and transmission and reception of signals with the external device by either a contact coupling using the connector or a non-contact coupling using the antenna, the IC card comprising:

coupling detecting means for detecting a contact coupling and a non-contact coupling, and communication cut-off means for cutting off the communication so that the communication is not performed on either of the couplings when there are supplied electric power or a signal for inducing the other coupling during communication on one coupling.

2. The IC card according to claim 1, wherein the coupling detecting means is constituted by a circuit which detects a supply voltage.

3. The IC card according to claim 1, wherein the coupling detecting means is constituted by a clock detector which detects a clock signal supplied.

4. The IC card according to claim 1, wherein the communication cut-off means is constituted by a circuit which, upon detection of one coupling, cuts off the transmission and reception of signals for the other coupling.

5. The IC card according to claim 4, wherein the communication cut-off means includes means for delaying cutting-off the communication, when memory of an information processor provided in the internal circuit is being written, until end of the writing.

6. The IC card according to claim 4, wherein the communication cut-off means includes means for resetting an information processor provided in the internal circuit simultaneously with cutting-off the communication.

7. The IC card according to claim 5, wherein the communication cut-off means further includes means for resetting the information processor in the internal circuit simultaneously with cutting-off the communication.

8. An IC (Integrated Circuit) card which has a semiconductor integrated circuit integrating an internal circuit for communication with an external device, an antenna and a connector, and is capable of supply of electric power and transmission and reception of signals with the external device by either a contact coupling using the connector or a non-contact coupling using the antenna, the IC card comprising:

a first detector for detecting the supply of either electric power or a signal inducing the contact coupling, a second detector for detecting the supply of either electric power or a signal inducing the non-contact coupling, a first gate circuit which performs disconnection of signals transmitted and received through the connector in accordance with an output signal provided from the second detector, and a second gate circuit which performs disconnection of signals transmitted and received through the antenna in accordance with an output signal provided from the first detector, wherein the first detector operates irrespective of whether the second detector is in operation or not, and the second detector operates irrespective of whether the first detector is in operation or not.

9. The IC card according to claim 8, wherein each of the first and second detectors is a circuit which detects a supply voltage.

10. The IC card according to claim 8, wherein each of the first and second detectors is a circuit which detects a clock signal supplied.

11. The IC card according to claim 8, wherein a logic circuit is connected between the first detector and the second gate circuit and also between the second detector and the first gate circuit, the logic circuit delaying the disconnection of the signals, when memory of an information processor provided in the internal circuit is being written, until end of the writing.

12. The IC card according to claim 8, further including a circuit which inputs output signals from the first and second detectors respectively to reset an information processor provided in the internal circuit.

13. The IC card according to claim 11, further including a circuit which inputs an output signal from the logic circuit to reset the information processor in the internal circuit.

14. The IC card according to claim 8, further comprising a logic circuit which delays the disconnection of the signals, when memory of an information processor provided in the internal circuit is being written, until end of the writing.

* * * * *